(12) United States Patent
Moon et al.

(10) Patent No.: US 9,866,821 B2
(45) Date of Patent: Jan. 9, 2018

(54) RECTIFICATION APPARATUS OF STEREO VISION SYSTEM AND METHOD THEREOF

(71) Applicant: KYUNGPOOK NATIONAL UNIVERSITY INDUSTRY-ACADEMIC COOPERATION FOUNDATION, Daegu (KR)

(72) Inventors: Byungin Moon, Daegu (KR); Jongkil Hyun, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 55 days.

(21) Appl. No.: 14/990,245

(22) Filed: Jan. 7, 2016

(65) Prior Publication Data

US 2017/0148150 A1 May 25, 2017

(30) Foreign Application Priority Data

Nov. 20, 2015 (KR) .................. 10-2015-0163224

(51) Int. Cl.
*H04N 13/02* (2006.01)
*G06T 7/80* (2017.01)
*G06T 7/593* (2017.01)

(52) U.S. Cl.
CPC ......... *H04N 13/0271* (2013.01); *G06T 7/593* (2017.01); *G06T 7/85* (2017.01); *H04N 13/0246* (2013.01); *G06T 2207/30252* (2013.01)

(58) Field of Classification Search
CPC ... G06T 7/002; G06T 7/0075; H04N 13/0246; H04N 13/0271
USPC .................. 382/154, 103, 118, 106, 46, 42
See application file for complete search history.

(56) References Cited

U.S. PATENT DOCUMENTS

| 6,215,898 | B1* | 4/2001 | Woodfill | G06K 9/32 348/47 |
| 8,427,524 | B2* | 4/2013 | Jeong | G06K 9/32 348/42 |
| 8,897,502 | B2* | 11/2014 | Lu | H04N 13/0239 382/118 |
| 2003/0156751 | A1* | 8/2003 | Lee | G06K 9/03 382/154 |
| 2004/0218784 | A1* | 11/2004 | Nichani | G01V 8/10 382/103 |

(Continued)

*Primary Examiner* — Amara Abdi
(74) *Attorney, Agent, or Firm* — Porzio Bromberg & Newman P.C.

(57) ABSTRACT

Provided is a rectification apparatus of a stereo vision system and a method thereof. The method comprises: distinguishing variables and parameters preset in a determinant configured with parameters of the stereo cameras and rectification parameters for axial movement of the rectification, and converting the determinant into a linear function by substituting constant parameters for the parameters preset in the determinant; storing left and right images transmitted from the stereo cameras; sequentially performing a coordinate operation; calculating a weight and coordinates of a camera image plane; and linearly interpolating the pixel value by using the calculated weight and coordinates of the camera image plane, and then mapping the pixel value to the coordinates of the rectified image plane.

5 Claims, 5 Drawing Sheets

(56) References Cited

U.S. PATENT DOCUMENTS

| | | | |
|---|---|---|---|
| 2009/0022393 A1* | 1/2009 | Bar-Zohar | G06T 7/593 382/154 |
| 2010/0066811 A1* | 3/2010 | Chang | H04N 13/0025 348/43 |
| 2013/0083002 A1* | 4/2013 | Hwang | H04N 13/0022 345/419 |
| 2014/0118501 A1* | 5/2014 | Kim | H04N 13/0239 348/46 |
| 2014/0314309 A1* | 10/2014 | Lee | H04N 13/0011 382/154 |
| 2015/0261003 A1* | 9/2015 | Morifuji | G09G 3/003 345/8 |

\* cited by examiner

FIG. 1a

Prior Art

STEREO CAMERAS

FIG. 1b

Prior Art

LEFT AND RIGHT IMAGES

FIG. 2

Prior Art

RECTIFICATION APPARATUS OF STEREO VISION SYSTEM AND METHOD THEREOF

BACKGROUND

The present invention relates to a rectification apparatus of a stereo vision system and a method thereof and, more specifically, to a rectification apparatus of a stereo vision system and a method thereof, capable of simplifying a complicated matrix operation of calculating coordinates of a camera image corresponding to coordinates of a rectified image by substitution to a linear function.

Human vision is one of senses for obtaining surrounding environment information, and is to recognize a distance by synthesizing two kinds of visual information incoming through two eyes into one kind of information. A system obtained by embodying such a visual structure of human with two cameras is a stereo vision system.

The stereo vision system simultaneously receives left and right images from two cameras using two cameras imitating the human vision, and calculates a distance from the cameras to a subject from the left and right images, to obtain a 3-dimensional image.

Since two cameras are installed at spatially different positions, a disparity occurs between two cameras with respect to the same subject. In this case, according to phenomenon of binocular disparity, the disparity gets larger as the cameras get closer to the subject, and the disparity gets smaller as the cameras get farther from subject. The stereo vision system acquires a 3-dimensional distance information from disparity information based on such binocular disparity.

In the stereo vision system, the disparity information is calculated through a stereo matching process. In this case, the stereo matching is to find matching points corresponding to the same point of the subject in left and right images, and to calculate disparity information between the matching points found in the left and right images.

When the matching points are to be found in the stereo matching process, the operation thereof is performed for each pixel. In this case, since the stereo cameras physically have positional difference from each other, in order to find one point in a left image in a right image, a disparity searching process has to be performed on all points of the right image for each pixel. In such a case, since the entire image has to be searched to find the matching point for one pixel, the amount of operation is large, and thus there is a problem of difficulty in actual embodying.

Accordingly, since a real time image process and embodying of a 3-dimensional image are difficult in the stereo vision system due to a disparity searching time necessary in the stereo matching process, a rectification process of reducing a disparity search range to one dimension by reducing a search range for finding disparity to one row by allowing up and down disparity between left and right images to coincide with each other is necessary.

In the stereo vision system, two cameras are arranged on the same row through a rectification process, and it is possible to extract disparity information of an object on the basis thereof. In stereo cameras, tolerance may occur in a producing process or a position of the camera may deviate during using. In this case, the stereo camera may not be arranged on the same line. Particularly, in the case of a camera mounted on a vehicle, a position thereof easily deviates due to impact or the like. Accordingly, it is difficult to allow the row between the stereo cameras to physically coincide, and a rectification process of allowing the row to coincide is necessarily required.

Figure 1A:
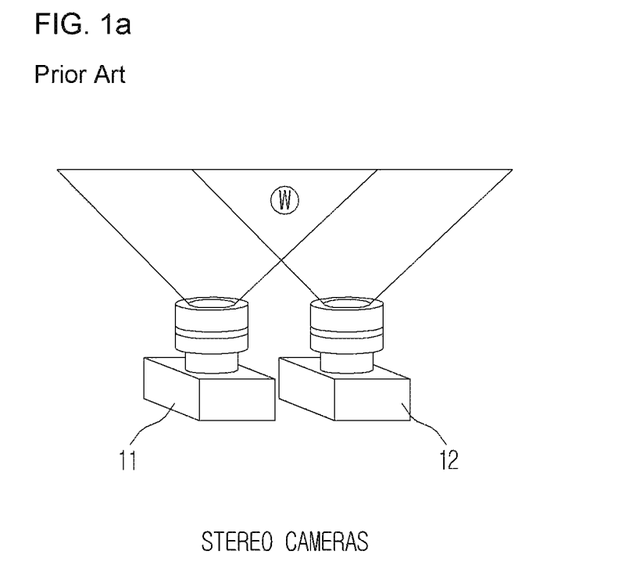
FIG. 1A is a diagram illustrating a component of a stereo camera for explaining a rectification process of a stereo vision system according to the related art.
Figure 1B:
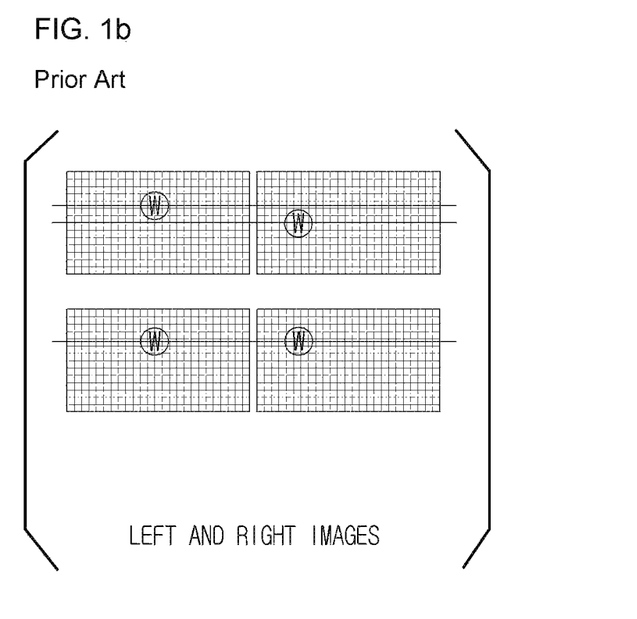
FIG. 1B is a diagram illustrating left and right images photographed by a stereo camera.
Figure 2:
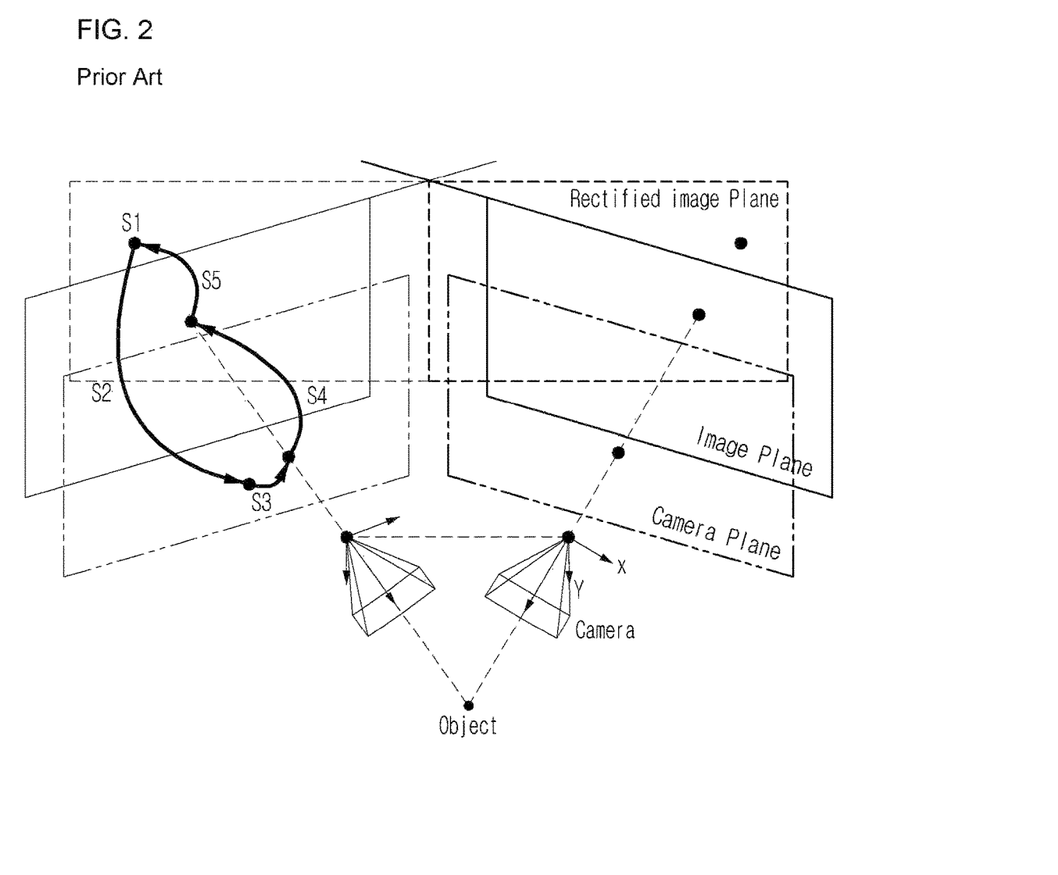
FIG. 2 is a diagram sequentially illustrating the rectification process illustrated in FIG. 1A and FIG. 1B.

FIG. 1A is a diagram illustrating a component of a stereo camera for explaining a rectification process of a stereo vision system according to the related art, FIG. 1B is a diagram illustrating left and right images photographed by a stereo camera, and FIG. 2 is a diagram sequentially illustrating the rectification process illustrated in FIG. 1A and FIG. 1B.

Referring to FIG. 1A, FIG. 1B, and FIG. 2, in a rectification process, a stereo vision system allows up and down disparity for left and right images of stereo cameras 11 and 12 to coincide, to reduce a disparity search range a in a stereo matching process to one dimension.

First, in the rectification process, coordinates of a rectified image plane are assumed (S1), and the coordinates of the rectified image plane are moved along a camera axis to calculate coordinates of the camera coordinate axis (S2).

Thereafter, in the rectification process, the image is rotated to the coordinates before the rectification on the camera coordinate axis, and the coordinates of the camera coordinate axis before the rectification are calculated (S3), and the coordinates calculated in Step (S3) are projected onto the camera image plane, and coordinates of the camera image plane are calculated (S4). Lastly, in the rectification process, pixel values of the camera image plane coordinates calculated in Step (S4) are mapped to pixel values of the rectified image plane coordinates assumed in Step (S1), (S5).

As described above, in the rectification process, a virtual rectified image is assumed, Steps (S1 to S5) are repeated from a point of coordinates (0, 0) of the virtual rectified image plane as much as camera resolution, camera image plane coordinates before performing the rectification are found, and the coordinates of the rectified image plane are gradually filled with a pixel value of the coordinates.

In this case, in the rectification process, it is possible to acquire processes of axial movement and rotation from the coordinates of the rectified image plane to the camera coordinates, and axial movement to the coordinates of each camera image plane, by using Equation 1.

$$\begin{bmatrix} x \\ y \\ z \end{bmatrix} = A \cdot R_{rect}^T \cdot A_{rect}^{-1} \cdot \begin{bmatrix} x_{rect} \\ y_{rect} \\ 1 \end{bmatrix} \qquad \text{[Equation 1]}$$

In Equation 1, $[x\ y\ z]^T$ denotes coordinates of a camera image homogeneous coordinate axis, A denotes intrinsic parameters of a camera as a matrix of 3×3, $A_{rect}$ denotes intrinsic parameters of a rectified image plane as a matrix of 3×3, $R_{rect}$ denotes a rectification rotation matrix of 3×3, and $[x_{rect}\ y_{rect}\ 1]$ denotes coordinates of a rectified image plane homogeneous coordinate axis. In Equation 1, the intrinsic parameters of the camera and the intrinsic parameter of the rectified image plane, and the rectification rotation matrix, which are the other parameters excluding the coordinate, are fixed parameter extracted through camera calibration.

As described above, in order to perform the stereo matching process in the stereo vision system, the rectification is a preprocessing process required necessarily, but the rectification process is formed of a complicated matrix operation such as axial movement and image rotation, and there is a problem of requiring a great amount of operations in spite of the preprocessing process.

SUMMARY OF THE INVENTION

The invention is to provide a rectification apparatus of a stereo vision system and a method thereof, in which parameter values extracted in a calibration process of a camera in a complicated matrix operation of rectification are substituted by constant values, and then the complication matrix operation is simplified to a simple cumulative operation using regularity of a camera coordinate operation, thereby drastically reducing the amount of operation as compared with the existing rectification method.

According to an aspect of the invention to achieve the object described above, there is provided a rectification method of a stereo vision system performed by a stereo vision system including a preprocessing module performing rectification for left and right images acquired from stereo cameras, including: distinguishing variables and parameters preset in a determinant configured with parameters of the stereo cameras and rectification parameters for axial movement of the rectification, and converting the determinant into a linear function by substituting constant parameters for the parameters preset in the determinant; storing left and right images transmitted from the stereo cameras; sequentially performing a coordinate operation as a cumulative operation for each pixel by using the linear function in a direction of increasing a column or a direction of increasing a row with respect to rectified image plane coordinates; calculating a weight and coordinates of a camera image plane for linear interpolation of a pixel value in the coordinates corresponding to the resulting value of the coordinate operation; and linearly interpolating the pixel value by using the calculated weight and coordinates of the camera image plane, and then mapping the pixel value to the coordinates of the rectified image plane.

Preferably, in sequentially performing a coordinate operation as a cumulative operation for each pixel by using the linear function in a direction of increasing a column or a direction of increasing a row with respect to the rectified image plane coordinates, when the coordinate operation is performed in the direction of increasing a column, the linear function in which a variable in the direction increasing a row is fixed becomes a first linear equation having a first inclination, and when the coordinate operation is performed in the direction increasing a row, the linear function in which a variable in the direction of increasing a column is fixed becomes a second linear equation having a second inclination, and when the coordinate operation is performed in the direction of increasing a column, a constant as much as the first inclination is accumulated for each pixel, and when the coordinate operation is performed in the direction increasing a row, a constant as much as the second inclination is accumulated for each pixel.

Preferably, the determinant is as Equation 1, the constant parameters are as Equation 2, and the linear function for the variable is as Equation 3.

Preferably, in performing a coordinate operation for each pixel by using the linear function in a direction of increasing a column or a direction of increasing a row with respect to the rectified image plane coordinates, in a case where the left and right images are M×N images, when the coordinate operation is performed in the direction of increasing a column, a variable ($y_{rect}$) of the linear function in the direction of increasing a row is fixed and the first inclination becomes $[c_{11}\ c_{21}\ c_{31}]^T$, and when the coordinate operation is performed in the direction of increasing a row, a variable ($x_{rect}$) is fixed and the second inclination becomes $[C_{12}-(M-1)c_{11}\ C_{22}-(M-1)c_{21}\ C_{32}-(M-1)c_{31}]^T$.

Preferably, an initial value is $[c_{13}\ c_{23}\ c_{33}]^T$ at (0, 0) that is a first point of image plane coordinates of the rectification.

According to an aspect of the invention to achieve the object described above, there is provided a rectification apparatus of a stereo vision system including a preprocessing module performing rectification for left and right images acquired from stereo cameras, wherein the preprocessing module includes: an image storing unit which stores the left and right images transmitted from the stereo cameras; a coordinate operating unit which distinguishes variables and parameters preset in a determinant configured with parameters of the stereo cameras and rectification parameters for axial movement of the rectification, converts the determinant into a linear function by substituting constant parameters for the parameters preset in the determinant, and then performs a coordinate operation as a cumulative operation for each pixel with respect to coordinates of a camera image plane corresponding to a rectified image plane by using the linear function; a coordinate calculating unit which calculates a weight and coordinates of a camera image plane for linear interpolation of a pixel value in the coordinates corresponding to the resulting value of the coordinate operation; and a coordinate mapping unit which interpolates the pixel value of the coordinates calculated in the coordinate operating unit by using the weight and coordinates calculated in the coordinate calculating unit with respect to the left and right images stored in the image storing unit, and maps the pixel value to the coordinates of the rectified image plane.

Preferably, the preprocessing module further comprises an image receiving unit for receiving the left image and the right image transmitted from the stereo cameras and transmitting them to the image storing unit.

Preferably, the determinant is as Equation 1, the constant parameters are as Equation 2, and the linear function for the variable is as Equation 3.

Preferably, in coordinate operating unit, in a case where the left and right images are M×N images, when the coordinate operation is performed in the direction of increasing a column, a variable ($y_{rect}$) of the linear function in the direction of increasing a row is fixed and the first inclination becomes $[c_{11}\ c_{21}\ c_{31}]^T$, and when the coordinate operation is performed in the direction of increasing a row, a variable ($x_{rect}$) is fixed and the second inclination becomes $[C_{12}-(M-1)c_{11}\ C_{22}-(M-1)c_{21}\ C_{32}-(M-1)c_{31}]^T$.

Preferably, an initial value is $[c_{13}\ c_{23}\ c_{33}]^T$ at (0, 0) that is a first point of image plane coordinates of the rectification.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the invention will be described in detail with reference to the accompanying drawings. In the drawings, parts irrelevant to the description are omitted for a clear explanation of the present invention, and the same reference numeral is applied to the same parts throughout the specification. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention may be embodied in many different forms without departing from the spirit and significant characteristics of the invention. Therefore, the embodiments of the present invention are disclosed only for illustrative purposes and should not be construed as limiting the present invention.

It will be understood that, although the terms first, second, etc. may be used herein to describe various elements, these elements should not be limited by these terms.

These terms are only used to distinguish one element, from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween.

In contrast, it should be understood that when an element is referred to as being "directly coupled" or "directly connected" to another element, there are no intervening elements present.

The terminology used herein is for the purpose of describing particular embodiments only and is not intended to be limiting. As used herein, the singular forms "a," "an" and "the" are intended to include the plural forms as well, unless the context clearly indicates otherwise.

It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs.

Hereinafter, preferred embodiments of the present invention will be described in detail with reference to the attached drawings. The same reference numerals will be used throughout the different drawings to designate the same or similar components, and the repetition of the same explanation for these components will be skipped.

If in the specification, detailed descriptions of well-known functions or configurations would unnecessarily obscure the gist of the present invention, the detailed descriptions will be omitted.

Figure 3:
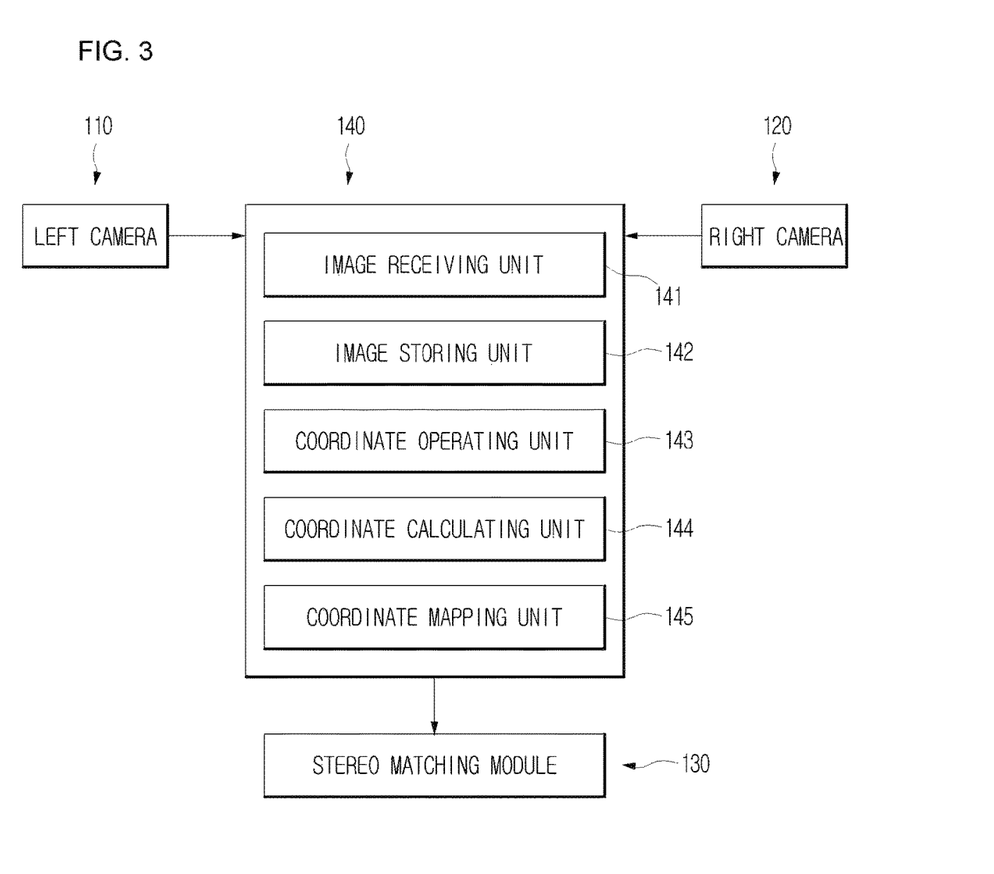
FIG. 3 is a block diagram illustrating a rectification apparatus of a stereo vision system according to an embodiment of the invention.

FIG. 3 is a block diagram illustrating a rectification apparatus of a stereo vision system according to an embodiment of the invention.

Referring to FIG. 3, a preprocessing module 140 of a rectification apparatus of a stereo vision system performs rectification for left and right images from stereo cameras, that is, cameras 110 and 120 positioned left and right, and transmits the rectified images to a stereo matching module 130.

The stereo matching module 130 finds matching points corresponding to the same point of one subject from the left image and the right image, and calculates disparity information between the left and right matching points found in such a manner.

The preprocessing module 140 includes an image receiving unit 141, an image storing unit 142, a coordinate operating unit 143, a coordinate calculating unit 144, and a coordinate mapping unit 145.

The image receiving unit 141 receives the left image and the right image transmitted from the left camera 110 and the right camera 120, and the image storing unit 142 stores the left image and the right image received by the image receiving unit 141.

The coordinate operating unit 143 distinguishes a variable and parameters present in a determinant configured with parameters of the stereo cameras 110 and 120 and rectification parameters for matrix operation of rectification, substitutes constant parameters for the parameters preset in the determinant, and converts the determinant into a linear function for the variable.

The coordinate calculating unit 143 assumes coordinates of a rectified image plane, and accumulates a coordinate operation for each pixel by using a linear function in a direction of increasing a column or a direction of increasing a row sequentially from the first point of rectified image plane coordinates (0, 0), thereby calculating coordinates of a camera image plane corresponding to the coordinates of the rectified image plane.

The coordinate calculating unit 144 calculates surrounding coordinates adjacent to the camera image plane coordinates calculated in the coordinate operating unit 143, and calculates a weight for linear interpolation of a pixel value in the coordinates calculated in the coordinate operating unit 143.

The coordinate mapping unit 145 linearly interpolates the pixel value with the left and right images stored in the image storing unit 142 by using the weight and coordinates calculated in the coordinate calculating unit 144, and calculates a rectified image by mapping the pixel value to the coordinates of the rectified image plane.

Accordingly, the preprocessing module 140 transmits the rectified image to the stereo matching module 130.

Figure 4:
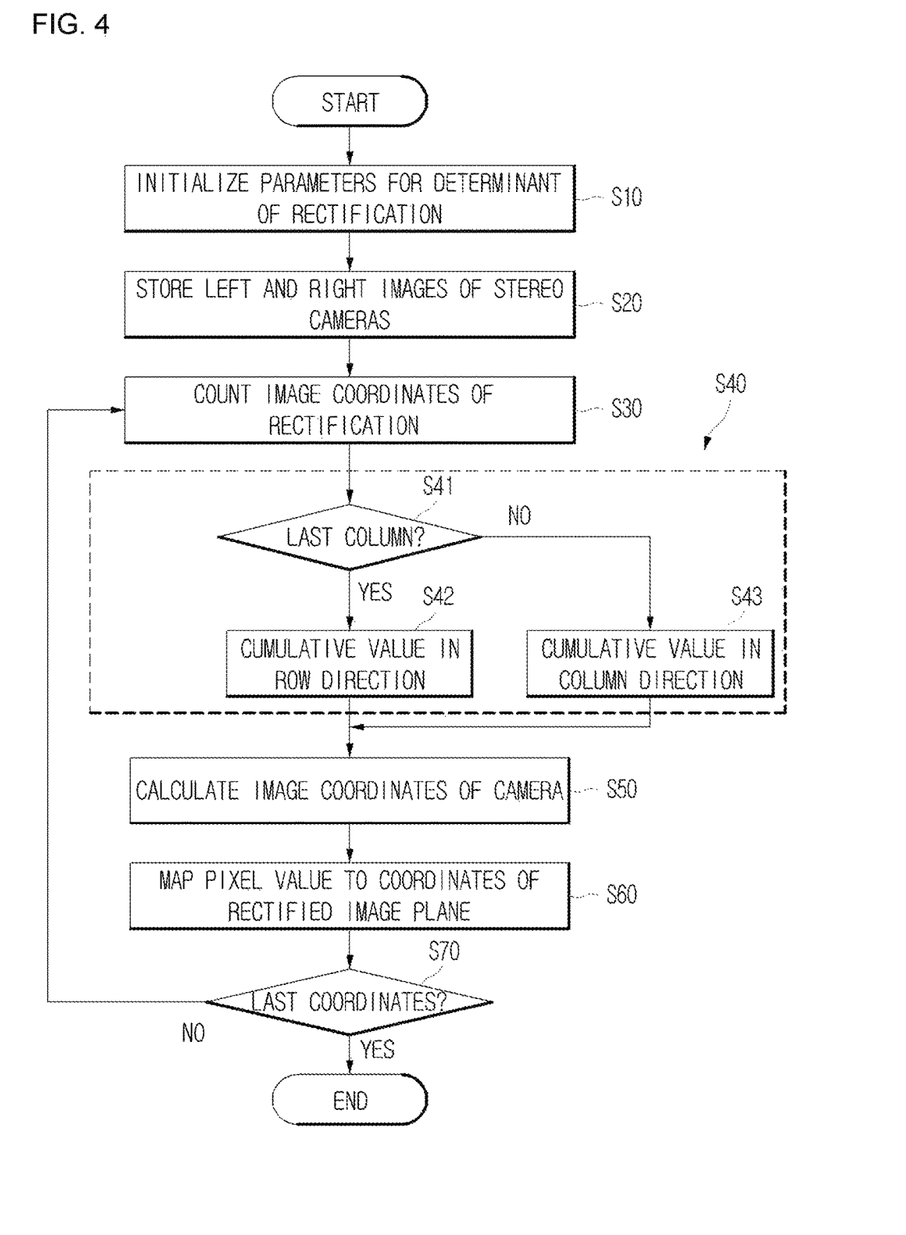
FIG. 4 is a flowchart illustrating a rectification method of a stereo vision system according to an embodiment of the invention.
Figure 5:
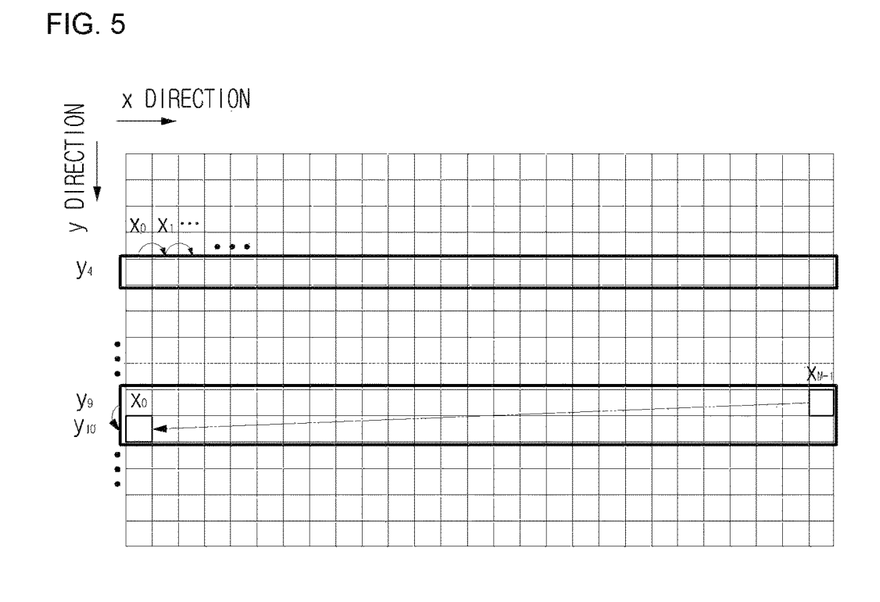
FIG. 5 is a diagram illustrating row change and column change of a coordinate operation of FIG. 4.

FIG. 4 is a flowchart illustrating a rectification method of a stereo vision system according to an embodiment of the invention, and FIG. 5 is a diagram illustrating increase of a column and increase of a row of a coordinate operation illustrated in FIG. 4.

Referring to FIG. 4 and FIG. 5, in the rectification method of the stereo vision system, a variable and parameters present in a determinant of Equation 1 used in the existing preprocessing module 140 are distinguished, and constant parameters for the parameters preset in the determinant are substituted, to convert Equation 1 into a linear function for the variable (S10).

Since a camera intrinsic parameter, a rectified image plane intrinsic parameter, and a rectification rotation matrix are parameters determined by calibration according to the stereo cameras 110 and 120, are set to the preset parameters, and may represent constant parameters as Equation 2.

$$\begin{bmatrix} c_{11} & c_{12} & c_{13} \\ c_{21} & c_{22} & c_{23} \\ c_{31} & c_{32} & c_{33} \end{bmatrix} \equiv A \cdot R_{rect}^T \cdot A_{rect}^{-1} \quad \text{[Equation 2]}$$

When Equation 1 is substituted by Equation 2, it may be represented by a simple linear function as Equation 3.

$$\begin{bmatrix} x \\ y \\ z \end{bmatrix} = \begin{bmatrix} c_{11}x_{rect} + c_{12}y_{rect} + c_{13} \\ c_{21}x_{rect} + c_{22}y_{rect} + c_{23} \\ c_{31}x_{rect} + c_{32}y_{rect} + c_{33} \end{bmatrix} \quad \text{[Equation 3]}$$

The preprocessing module 140 initializes parameters, then stores the left and right images transmitted from the stereo cameras 110 and 120 (S20), assumes rectified image plane coordinates, and then counts the rectified image plane coordinates for each pixel in a direction of increasing a column or a direction of increasing a row from a point of (0, 0) (S30).

The preprocessing module 140 sequentially performs a coordinate operation ($x_{rect}$, $y_{rect}$) from the point of the rectified image plane coordinates (0, 0) by using Equation 3 (S40). When the preprocessing module 140 rectifies an image with resolution of M×N, coordinate change occurs in an x direction (a direction of increasing a column) and a y direction (a direction of increasing a row) as illustrated in FIG. 5.

When the coordinate operation is performed in the x direction, there is no row change in the rectified image plane coordinates, that is, change in the y direction, and thus $y_{rect}$ is constant. Accordingly, in Equation 3, when $c_{12}y_{rect}$, $c_{22}y_{rect}$, and $c_{32}y_{rect}$ are represented by constant values, $[x\ y\ z]^T$ may be represented by a linear equation having an inclination $[c_{11}\ c_{21}\ c_{31}]^T$ as Equation 4. A coordinate operation is performed by accumulation of $[c_{11}\ c_{21}\ c_{31}]^T$ that is constants in a direction of increasing a column by using linearity as Equation 4 (S41 and S42).

$$\begin{bmatrix} x_{n+1} \\ y_{n+1} \\ z_{n+1} \end{bmatrix} = \begin{bmatrix} x_n \\ y_n \\ z_n \end{bmatrix} + \begin{bmatrix} c_{11} \\ c_{21} \\ c_{31} \end{bmatrix}, \quad \text{[Equation 4]}$$

$$\text{when columns increase} \left( \begin{bmatrix} x_0 \\ y_0 \\ z_0 \end{bmatrix} = \begin{bmatrix} c_{13} \\ c_{23} \\ c_{33} \end{bmatrix} \right)$$

In addition, when the coordinate operation is performed in the y direction, as illustrated in FIG. 5, $x_{rect}$ that is column change in the rectified image plane coordinates, that is, change in the x direction is changed to the first column of the next row at the last column of the current row whenever the row is changed. Accordingly, whenever the row is changed in Equation 3, the column is constantly M−1, thus $x_{rect}$ has a constant inclination, and $y_{rect}$ becomes a variable. In this case, as Equation 5, $[x\ y\ z]^T$ may be represented by a linear equation having an inclination $[c_{12}-(M-1)\cdot c_{11}\ c_{22}-(M-1)\cdot c_{21}\ c_{32}-(M-1)\cdot c_{31}]^T$ according to increase of $y_{rect}$. A coordinate operation may be performed by accumulation of $[c_{12}-(M-1)c_{11}\ c_{22}-(M-1)c_{21}\ c_{32}-(M-1)c_{31}]^T$ that is a constant whenever the row is changed by using Equation 5 (S41 and S43).

$$\begin{bmatrix} x_{n+1} \\ y_{n+1} \\ z_{n+1} \end{bmatrix} = \begin{bmatrix} x_n \\ y_n \\ z_n \end{bmatrix} + \begin{bmatrix} c_{12} - (M-1) \cdot c_{11} \\ c_{22} - (M-1) \cdot c_{21} \\ c_{32} - (M-1) \cdot c_{31} \end{bmatrix}, \quad \text{[Equation 5]}$$

$$\text{when rows increase} \left( \begin{bmatrix} x_0 \\ y_0 \\ z_0 \end{bmatrix} = \begin{bmatrix} C_{13} \\ C_{23} \\ C_{33} \end{bmatrix} \right)$$

As described above, in the coordinate operation, both a variable $x_{rect}$ in a direction of increasing a column and a variable $y_{rect}$ in a direction of increasing a row are 0 at the first point (0, 0) of the rectified image plane coordinates, thus the linear function has an initial value $[c_{13}\ c_{23}\ c_{33}]^T$, and a cumulative value constant in a direction of increasing a row and a cumulative value constant in a direction of increasing a column are accumulated.

Accordingly, the preprocessing module 140 calculates surrounding coordinates adjacent to the camera image plane coordinates that are the resulting values of the coordinate operating unit 142, and calculates a weight for linear interpolation of the pixel value in the resulting coordinates of the coordinate operating unit (S50).

The preprocessing module 140 linearly interpolates the pixel value by using the weight and the coordinates of the coordinate calculating unit 144 in the left and right images of the stereo cameras 110 and 120 stored in the image storing unit 142, and then maps the pixel value to the rectified image plane coordinates (S60).

In such a manner, the preprocessing module 140 performs the coordinate operation of all the pixels for the rectified image plane coordinates, and then transmits the rectified image to the stereo matching module 130 (S70).

TABLE 1

| Operation | Coordinate operation by determinant of Equation 1 | Coordinate operation by linear equation of Equation 4 and Equation 5 | Decrease |
|---|---|---|---|
| Add | 11059200 | 2764797 | 75% |
| Multiply | 12902400 | 0 | 100% |

When comparing the coordinate operation method using the determinant of Equation 1 with the coordinate operation method using Equation 4 and Equation 5 by the preprocessing module 140 in the image with resolution of 1280×720, the result is as Table 1. It can be known from Table 1 that it is possible to simplify and calculate a complicated matrix operation for an axial movement process of rectification by a cumulative value of constants, and thus it is possible to drastically reduce the amount of operation.

In the rectification apparatus of a stereo vision and the method thereof according to the invention, parameter values extracted in a calibration process of a camera in a complicated matrix operation of rectification are substituted by constant values, and then the complication matrix operation can be simplified to a simple cumulative operation using regularity of a camera coordinate operation, and thus a disparity search range of stereo matching is decreased to drastically reduce the operation, thereby easily performing and embodying a real time stereo matching process of left and right images transmitted from stereo cameras.

It has been described above with reference to the preferred embodiment, but those skilled in the art can understand that the invention can be variously amended and modified within the scope which does not deviate from the spirit and scope of the invention described in Claims.

What is claimed is:

1. A rectification method of a stereo vision system performed by a stereo vision system comprising the steps of:
   preprocessing for performing rectification for left and right images acquired from stereo cameras:
   distinguishing variables and parameters preset in a determinant configured with parameters of the stereo cameras and rectification parameters for axial movement of the rectification, and converting the determinant into a linear function by substituting constant parameters for the parameters preset in the determinant;
   storing left and right images transmitted from the stereo cameras;
   sequentially performing a coordinate operation as a cumulative operation for each pixel by using the linear function in a direction of increasing a column or a direction of increasing a row with respect to rectified image plane coordinates;
   calculating a weight and coordinates of a camera image plane for linear interpolation of a pixel value in the coordinates corresponding to a resulting value of the coordinate operation; and
   linearly interpolating the pixel value by using the calculated weight and coordinates of the camera image plane, and then mapping the pixel value to the coordinates of the rectified image plane.

2. The rectification method of the stereo vision system according to claim 1, wherein in sequentially performing a coordinate operation as a cumulative operation for each pixel by using the linear function in a direction of increasing a column or a direction of increasing a row with respect to the rectified image plane coordinates,
   when the coordinate operation is performed in the direction of increasing a column, the linear function in which a variable in the direction increasing a row is fixed becomes a first linear equation having a first inclination, and when the coordinate operation is performed in the direction increasing a row, the linear function in which a variable in the direction of increasing a column is fixed becomes a second linear equation having a second inclination, and
   when the coordinate operation is performed in the direction of increasing a column, a constant as much as the first inclination is accumulated for each pixel, and when the coordinate operation is performed in the direction increasing a row, a constant as much as the second inclination is accumulated for each pixel.

3. The rectification method of the stereo vision system according to claim 1, wherein the determinant is as Equation 1, the constant parameters are as Equation 2, and the linear function for the variable is as Equation 3, and $$\begin{bmatrix} x \\ y \\ z \end{bmatrix} = A \cdot R_{rect}^T \cdot A_{rect}^{-1} \cdot \begin{bmatrix} x_{rect} \\ y_{rect} \\ 1 \end{bmatrix} \quad \text{[Equation 1]}$$

$$\begin{bmatrix} c_{11} & c_{12} & c_{13} \\ c_{21} & c_{22} & c_{23} \\ c_{31} & c_{32} & c_{33} \end{bmatrix} \equiv A \cdot R_{rect}^T \cdot A_{rect}^{-1} \quad \text{[Equation 2]}$$

$$\begin{bmatrix} x \\ y \\ z \end{bmatrix} = \begin{bmatrix} c_{11}x_{rect} + c_{12}y_{rect} + c_{13} \\ c_{21}x_{rect} + c_{22}y_{rect} + c_{23} \\ c_{31}x_{rect} + c_{32}y_{rect} + c_{33} \end{bmatrix} \quad \text{[Equation 3]}$$

wherein in Equation 1 and Equation 2, A denotes an intrinsic parameter of a stereo camera, $R_{rect}$ denotes a rectification rotation matrix of the stereo camera, and $A_{rect}$ denotes an intrinsic parameter of the rectified image plane.

4. The rectification method of the stereo vision system according to claim 3, wherein in performing a coordinate operation for each pixel by using the linear function in a direction of increasing a column or a direction of increasing a row with respect to the rectified image plane coordinates,
   in a case where the left and right images are M×N images, when the coordinate operation is performed in the direction of increasing a column, a variable ($y_{rect}$) of the linear function in the direction of increasing a row is fixed and the first inclination becomes $[c_{11}\ c_{21}\ c_{31}]^T$, and when the coordinate operation is performed in the direction of increasing a row, a variable ($x_{rect}$) is fixed and the second inclination becomes $[C_{12}\text{-}(M\text{-}1)c_1\ C_{22}\text{-}(M\text{-}1)c_{21}\ C_{32}\text{-}(M\text{-}1)c_{31}]^T$.

5. The rectification method of stereo vision system according to claim 4, wherein an initial value is $[c_{13}\ c_{23}\ c_{33}]^T$ at (0, 0) that is a first point of image plane coordinates of the rectification.

* * * * *